United States Patent
Do et al.

(10) Patent No.: US 12,435,436 B2
(45) Date of Patent: Oct. 7, 2025

(54) ELECTROLYSIS ARRANGEMENT FOR ALKALINE ELECTROLYSIS AND METHOD THEREFOR

(71) Applicant: L'Air Liquide, Société Anonyme pour l'Etude et l'Exploitation des Procédés Georges Claude, Paris (FR)

(72) Inventors: Nga Thi Quynh Do, Frankfurt am Main (DE); Tibor Svitnic, Samorin (SK); Gary Combes, Frankfurt am Main (DE); Marie Khuny Khy, Champigny-sur-Marne (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 680 days.

(21) Appl. No.: 17/716,556

(22) Filed: Apr. 8, 2022

(65) Prior Publication Data

US 2022/0333260 A1  Oct. 20, 2022

(30) Foreign Application Priority Data

Apr. 9, 2021 (EP) .................................. 21020192

(51) Int. Cl.
*C25B 15/08* (2006.01)
*C25B 1/04* (2021.01)
(Continued)

(52) U.S. Cl.
CPC .............. *C25B 15/087* (2021.01); *C25B 1/04* (2013.01); *C25B 9/21* (2021.01); *C25B 9/77* (2021.01); *C25B 15/02* (2013.01); *C25B 15/083* (2021.01)

(58) Field of Classification Search
CPC ................................ C25B 1/04; C25B 15/087
See application file for complete search history.

(56) References Cited

U.S. PATENT DOCUMENTS

| 4,323,442 A * | 4/1982 | Lantin ....................... C25B 9/73 |
| | | 204/266 |
| 2021/0262101 A1* | 8/2021 | Tanaka .................. C25B 15/087 |

FOREIGN PATENT DOCUMENTS

| CA | 2 435 902 | 8/2002 |
| CN | 103 882 466 | 5/2016 |

(Continued)

OTHER PUBLICATIONS

Trinke, P. et al., Hydrogen crossover in PEM and alkaline water electrolysis: mechanisms, direct comparison and mitigation strategies, J. Electrochem. Soc. 165, 2018, F502-F513.
(Continued)

*Primary Examiner* — Hosung Chung
(74) *Attorney, Agent, or Firm* — Elwood L. Haynes

(57) ABSTRACT

The invention relates to an electrolysis arrangement for the production of hydrogen and oxygen by alkaline electrolysis. The electrolysis arrangement includes a system configuration which enables to balance the lye concentrations between the anode and cathode section of the arrangement depending on the current density of the direct current supplied to the electrolysis stack of the electrolysis medium. At high current densities, hydrogen to oxygen crossover and oxygen to hydrogen crossover is low, which allows full mixing of electrolysis media to balance the concentration between anolyte and catholyte. At low current densities, hydrogen to oxygen crossover and oxygen to hydrogen crossover is high. Therefore, the electrolysis arrangement is configured so that the mixing of the electrolysis media is decreased in case a current density of a direct current supplied to the electrolysis stack is decreased.

14 Claims, 4 Drawing Sheets

(51) Int. Cl.
    *C25B 9/21*     (2021.01)
    *C25B 9/77*     (2021.01)
    *C25B 15/02*     (2021.01)

(56) References Cited

FOREIGN PATENT DOCUMENTS

| | | |
|---|---|---|
| EP | 1 243 671 | 9/2002 |
| EP | 3 770 304 | 1/2021 |
| JP | 2016 204698 | 12/2016 |

OTHER PUBLICATIONS

European Search Report and Written Opinion for corresponding EP 21020192, Sep. 23, 2021.

\* cited by examiner

ELECTROLYSIS ARRANGEMENT FOR ALKALINE ELECTROLYSIS AND METHOD THEREFOR

CROSS REFERENCE TO RELATED APPLICATIONS

This application claims the benefit of priority under 35 U.S.C. § 119 (a) and (b) to European Patent Application No. EP 21020192.7, filed Apr. 9, 2021, the entire contents of which are incorporated herein by reference.

TECHNICAL FIELD

The invention relates to an electrolysis arrangement for the electrochemical production of hydrogen and oxygen from an alkaline electrolysis medium and a method to produce hydrogen and oxygen by alkaline water electrolysis.

BACKGROUND ART

In alkaline electrolysis of water, a highly concentrated lye solution is used as an electrolyte medium. In particular, aqueous potassium hydroxide with a concentration of 1 mol/l (1 M) up to 6 mol/l (6 M) is used as electrolyte.

In alkaline electrolysis, the following half reactions occur at the anode and cathode sections of the electrolysis stack:

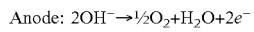

Anode: $2OH^- \rightarrow \frac{1}{2}O_2 + H_2O + 2e^-$

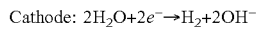

Cathode: $2H_2O + 2e^- \rightarrow H_2 + 2OH^-$

This results in the following sum of the two half reactions.

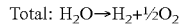

Total: $H_2O \rightarrow H_2 + \frac{1}{2}O_2$

Hence, one mole of water is produced at the anode and 2 moles of water are consumed at the cathode per mole of produced hydrogen. So due to the constantly proceeding electrochemical reaction of water splitting, the concentration of the lye in the anode and the cathode sections of the electrolysis arrangement will change over time. In the anode section the lye concentration decreases due to generation of water, and in the cathode section the lye concentration increases due to the consumption of water. This imbalance is further triggered by the electro-osmotic drag of hydroxyl ions, as each hydroxyl ion is able to take up to 2 water molecules.

Hence, in known electrolysers, mixing of the lye withdrawn from the anode and cathode section of the stack is done after separation of the hydrogen and oxygen product gases to balance the lye concentration of the cycle streams. After mixing, the stream with balanced lye concentration is split and the separated streams are fed to the anode and cathode section of the stack respectively for further water splitting. If the concentrations of the lye streams are not balanced, the concentrations would continue to diverge, which causes efficiency losses on the electrolyser performance. This becomes apparent from the dependence of electrical conductivity of the lye on the lye concentration. There is a distinct maximum in the conductivity corresponding to an optimal lye concentration from the point of view of ohmic losses of the electrolyser. For example, when performing electrolysis at 85° C., a concentrated aqueous KOH solution has the highest specific electrical conductivity at about 33% wt. The specific electrical conductivity therefore decreases both at higher and lower KOH concentrations. Additionally, if the lye concentration is not balanced, the lye concentration on the cathode side can lead to crystallisation, as the crystallisation temperature rises steeply in case of KOH with increasing lye concentration.

However, the balancing of the lye concentrations also has drawbacks. In case of full mixing of the different lye cycles, dissolved gases, e.g. gases which were not separated from the alkaline electrolyte solution by the respective gas-liquid-separators, get introduced to the product gas streams. In particular, hydrogen gets introduced to the oxygen stream (hydrogen to oxygen, also "HTO") and oxygen gets introduced to the hydrogen stream (oxygen to hydrogen, also "OTH").

Furthermore, hydrogen and oxygen are susceptible to diffusion through the membrane (diaphragm) which separates the anode and cathode chamber of the electrolysis stack. Given the slower diffusion rates of oxygen through the hydroxyl ion permeable membrane (diaphragm) from the anode into the cathode half cell compared to the diffusion rates of hydrogen through the membrane from the cathode into the anode half cell, HTO crossover is in particular relevant. Therefore, a potential risk of operation of an electrolyser is that a lower explosion limit (LEL) for hydrogen in oxygen (HTO) in the anode section of the electrolyser might get exceeded.

According to P. Trinke et al (2018 *J. Electrochem. Soc.* 165 F502), the concentration of impurities, in particular HTO, are higher in case of full mixing of the lye cycles in comparison to a mode where the lye cycles are completely separated. Furthermore, the authors report that the hydrogen in oxygen concentration (HTO) significantly increases in full mix mode when the current density of the direct current supplied to the electrolyser stack decreases. This effect is further enhanced by high pressures. However, this poses a problem when an electrolyser is not operated under constantly high (hydrogen production) capacities, i.e. constantly high current densities supplied to the electrolyser stack. In particular at low turn-down capacities, e.g. when capacity utilization is low, the LEL might get exceeded when the electrolyser is operated with full mixing of the lye cycles. This is in particular relevant for those alkaline electrolysers, which use electrical power from renewable energy sources, for example wind power or solar power. For those power sources it cannot be ensured that the direct current required to operate the electrolyser is supplied with constant current density. However, the problem is not limited to fluctuating renewable energy supply, but also in terms of fluctuating power supply in cases of grid balancing, dynamic customer demand and the like. Furthermore, the problem always occurs in case the electrolyser needs to be shut down, for example to carry out maintenance.

So due to the fact that at low turn-down capacities the LEL for HTO might get exceeded when HTO is the highest, the minimum production capacity of the electrolyser is limited. In other words, the electrolyser can only be operated safely within a certain operating window. To allow for a larger operating range of the electrolyser, the hydrogen content in the oxygen product stream needs to be reduced, in particular at low production capacities, when also the current density of the direct current supplied to the electrolyser stack is low.

SUMMARY

It is therefore an object of the present invention to provide an electrolysis arrangement which at least in part overcomes the problems of the prior art.

In particular, an object of the present invention is to provide an electrolysis arrangement which can be operated safely at changing high and low capacities without exceeding a lower explosion limit threshold for HTO.

A further object of the present invention is to provide an electrolysis arrangement which can be operated safely at changing high and low current densities of the direct current supplied to the electrolysis stack without exceeding a lower explosion limit threshold for HTO.

It is a further object of the present invention to provide a method which at least partly solves the aforementioned underlying problems.

A contribution to the at least partial solution of at least one of the above mentioned objects is provided by the subject-matter of the independent claims. The dependent claims provide preferred embodiments which contribute to the at least partial solution of at least one of the objects. Preferred embodiments of elements of a category according to the invention shall, if applicable, also be preferred for components of same or corresponding elements of a respective other category according to the invention.

The terms "having", "comprising" or "containing" etc. do not exclude the possibility that further elements, ingredients etc. may be comprised. The indefinite article "a" or "an" does not exclude that a plurality may be present.

In general, at least one of the underlying problems of the prior art is at least partially solved by an electrolysis arrangement comprising an electrolysis stack for the electrochemical production of hydrogen and oxygen from an alkaline electrolysis medium, wherein the electrolysis stack comprises an anode chamber and a cathode chamber;

an anode separator for the separation of oxygen from the electrolysis medium, a cathode separator for the separation of hydrogen from the electrolysis medium, a first pipe system to circulate the electrolysis medium between the anode chamber of the electrolysis stack and the anode separator;

a second pipe system to circulate the electrolysis medium between the cathode chamber of the electrolysis stack and the cathode separator;

a third pipe system interconnecting the first pipe system and the second pipe system and comprising a mixing device, wherein the first pipe system, the second pipe system and the third pipe system are configured so that a first fraction of an electrolysis medium withdrawn from the anode separator and a second fraction of an electrolysis medium withdrawn from the cathode separator is mixed by the mixing device, thereby resulting in a fraction of a mixed electrolysis medium which is fed to the electrolysis stack, wherein the electrolysis arrangement is further configured so that an amount of the fraction of the mixed electrolysis medium is decreased when a current density of a direct current supplied to the electrolysis stack is decreased, and an amount of the fraction of the mixed electrolysis medium is increased when a current density of a direct current supplied to the electrolysis stack is increased.

According to an embodiment, the first pipe system, the second pipe system and the third pipe system are configured so that a first fraction of an electrolysis medium withdrawn from the anode separator and a second fraction of an electrolysis medium withdrawn from the cathode separator are mixable by the mixing device, thereby resulting in a fraction of a mixed electrolysis medium which is fed to the electrolysis stack.

The current density of the direct current is the amount of charge per unit time that flows through a unit area of a given cross section. The current density, for example, is given in $A/m^2$.

The electrolysis arrangement according to the invention allows to react to fluctuating direct current densities supplied to the electrolysis stack in such a way that the LEL for HTO is not exceeded even at low production capacities. This is solved according to the invention in a way that an amount of the fraction of a mixed electrolysis solution, which is obtained by mixing electrolysis solution withdrawn from the anode separator and the cathode separator, is decreased when the current density decreases and is increased when the current density increases. At high current densities, the HTO crossover from the cathode chamber to the anode chamber of the electrolysis stack is low. So a higher mixing rate of the electrolysis media withdrawn from the anode and cathode separators respectively can be set at high current densities. At low current densities, the HTO crossover from the cathode chamber to the anode chamber of the electrolysis stack is high. So a lower mixing rate of the electrolysis media withdrawn from the anode and cathode separators can be set at low current densities.

In one embodiment, the electrolysis stack comprises a plurality of electrodes, in particular a plurality of anodes and cathodes. Accordingly, the electrolysis stack may comprise a plurality of anode chambers and cathode chambers. The number of electrodes, i.e. anodes and cathodes, and anode and cathode chambers respectively, depends on the production capacity, i.e. the size of the electrolyser of the electrolysis arrangement and which type of electrolysis stack is used. The electrolysis stack is configured for the production of hydrogen and oxygen from an alkaline electrolysis medium. In one embodiment, the desired product of the electrolysis arrangement is hydrogen. In one embodiment, the electrolysis medium is aqueous potassium hydroxide (KOH) solution. In one embodiment, the concentration of the KOH is up to 6 mol/l (6 M). In the anode chamber(s) of the electrolysis stack, oxygen is generated by oxidation of water-bound oxygen (oxidation number minus 2). In the cathode chamber(s) of the electrolysis stack, hydrogen is generated by reduction of water-bound hydrogen (oxidation number plus 1).

The oxygen generated in the anode chamber of the electrolysis stack is transported with the electrolysis medium via the first pipe system to the anode separator. In the anode separator, the gaseous oxygen is separated from the liquid electrolysis medium. The oxygen depleted electrolysis medium, which still comprises dissolved oxygen, is further transported via the first pipe system back to the anode chamber of the electrolysis stack, where it is subjected again to the electrolysis reaction. Hence, the electrolysis medium is circulated via the first pipe system between the anode chamber of the electrolysis stack and the anode separator. The electrolysis medium circulating in the first pipe system is also referred to as the anolyte of the electrolysis arrangement.

The hydrogen generated in the cathode chamber of the electrolysis stack is transported with the electrolysis medium via the second pipe system to the cathode separator. In the cathode separator, the gaseous hydrogen is separated from the liquid electrolysis medium. The hydrogen depleted electrolysis medium, which still comprises dissolved hydrogen, is further transported via the second pipe system back to the cathode chamber of the electrolysis stack, where it is subjected again to the electrolysis reaction. Hence, the electrolysis medium is circulated via the second pipe system between the cathode chamber of the electrolysis stack and the cathode separator. The electrolysis medium circulating in the second pipe system is also referred to as the catholyte of the electrolysis arrangement.

A third pipe system interconnects the first pipe system and the second pipe system. Without the third pipe system, the first pipe system and the second pipe system would be completely separate from each other, and no direct material exchange between the first pipe system and the second pipe system, which each form their own circuits, would be possible. Hence, the third pipe system provides a connection between the first pipe system and the second pipe system which provides direct material exchange between the anolyte and the catholyte. The third pipe system comprises a mixing device. The mixing device allows for mixing of the anolyte and the catholyte so that differences in concentration, e.g. molar concentrations between the anolyte and the catholyte can be balanced. The mixing device can be any device suitable for mixing the anolyte and the catholyte. In one embodiment, the mixing device is a static mixer. In case the pipe arrangement is suitable for mixing the anolyte and catholyte per se, the mixing device is a part of the pipe system in which the anolyte and the catholyte are mixed. This may be applicable in case of a sufficient length of the first pipe system, the second pipe system and/or the third pipe system.

The first, second and third pipe system are configured in such a way that a first fraction of an electrolysis medium withdrawn from the anode separator (unmixed anolyte) and a second fraction of an electrolysis medium withdrawn from the cathode separator (unmixed catholyte) are mixed or can be mixed (are mixable) by the mixing device. In other words, a fraction of the unmixed anolyte, referred to as the first fraction of the electrolysis medium, and a fraction of the unmixed catholyte, referred to as the second fraction of the electrolysis medium, are mixed or can be mixed (are mixable) by the mixing device. Mixing of fractions of the unmixed anolyte and the unmixed catholyte result in a fraction of a mixed electrolysis medium, which is fed to the electrolysis stack. At the same time, unmixed anolyte and/or unmixed catholyte, which are withdrawn from the anode and cathode separators and not subjected to mixing, are fed or can be fed to the electrolysis stack.

When a current density of the direct current supplied to the electrolysis stack is decreased, the amount of the fraction of the mixed electrolysis medium, i.e. the electrolysis medium obtained from mixing of the unmixed anolyte and the unmixed catholyte, is also decreased. In other words, in such a case the amount of the fraction of the mixed electrolysis medium is decreased and the amount of the fraction of the unmixed electrolysis medium, not subjected to the third pipe system comprising the mixing device, is increased correspondingly.

In case a current density of the direct current supplied to the electrolysis stack is increased, the amount of the fraction of the mixed electrolysis medium, i.e. the electrolysis medium obtained from mixing of the anolyte and the catholyte, is also increased. In other words, in such a case the amount of the fraction of the mixed electrolysis medium is increased and the amount of the fraction of the unmixed electrolysis medium, not subjected to the third pipe system comprising the mixing device, is decreased correspondingly.

In one embodiment, the first pipe system comprises a pump to circulate the electrolysis medium between the anode chamber of the electrolysis stack and the anode separator. In one further embodiment, the second pipe system comprises a pump to circulate the electrolysis medium between the cathode chamber of the electrolysis stack and the cathode separator.

In one embodiment, the third pipe system is arranged downstream to the cathode and anode separators and upstream to the electrolysis stack.

In one embodiment, the electrolysis arrangement comprises a water feed to balance the water amount in the system of the electrolysis arrangement, as water is continuously consumed due to the electrolysis reaction. In one embodiment, the water feed comprises a water storage tank and a pump to supply water to the first pipe system and/or the second pipe system of the electrolysis arrangement.

In one embodiment, the electrolysis stack comprises a membrane, also referred to as diaphragm, which enables transportation of hydroxyl ions ($OH^-$) between the anode chamber and the cathode chamber of the electrolysis stack and vice versa. In one embodiment, the electrolysis stack comprises a plurality of membranes for transportation of hydroxyl ions between anode and cathode chambers of the electrolysis stack.

In one embodiment, the fraction of the mixed electrolysis medium is split and separately fed to the anode chamber and the cathode chamber of the electrolysis stack. In other words, the fraction of the mixed electrolysis medium is also separated into an anolyte and a catholyte part, referred to as mixed anolyte and mixed catholyte, and fed to the anode chamber and cathode chamber of the electrolysis stack accordingly. In one embodiment, the mixed anolyte is fed to the anode chamber via the first pipe system. Hence, the unmixed and mixed anolyte are fed together through the same pipe system to the anode chamber of the electrolysis stack. In one embodiment, the mixed catholyte is fed to the cathode chamber via the second pipe system. Hence, the unmixed and mixed catholyte are fed together through the same pipe system to the cathode chamber of the electrolysis stack.

In one embodiment, the fraction of the mixed electrolysis medium is from 0% to 100% of the total amount of the alkaline electrolysis medium, or from 0.1% to 100%, or from 1% to 100%, or from 10% to 90%, or from 10% to 50%, or from 20% to 40%.

When the fraction of the mixed electrolysis medium is 0%, no mixing of the electrolysis medium withdrawn from the anode separator and the cathode separator within the third pipe system occurs. In one embodiment, the fraction of the mixed electrolysis medium is 0% for a lower capacity limit of the electrolysis arrangement, also referred to as lower reference capacity. In one embodiment, the fraction of the mixed electrolysis medium is 0% to 40% for the lower capacity limit of the electrolysis arrangement. In one embodiment, the fraction of the mixed electrolysis medium is 0% to 30% for the lower capacity limit of the electrolysis arrangement.

At the lower reference capacity, the HTO crossover from the cathode chamber to the anode chamber of the electrolysis stack is high, so that mixing of the unmixed anolyte and catholyte is not desired or less desired.

In one embodiment, the lower reference capacity is 50% or less compared to the upper capacity limit of the electrolysis arrangement, in particular 30% to 50% compared to the upper capacity limit of the electrolysis arrangement. In one embodiment, the lower reference capacity is 40% or less compared to the upper capacity limit of the electrolysis arrangement, in particular 30% to 40% compared to the upper capacity limit of the electrolysis arrangement. In one embodiment, the lower reference capacity is 30% or less compared to the upper capacity limit of the electrolysis arrangement, in particular 20% to 30% compared to the upper capacity limit of the electrolysis arrangement. In one embodiment, the lower reference capacity is 25% or less compared to the upper capacity limit of the electrolysis arrangement, in particular 10% to 25% compared to the upper capacity limit of the electrolysis arrangement. The lower reference capacity is also referred to as lower turn-down capacity.

In case the fraction of the mixed electrolysis medium is 100%, the electrolysis media withdrawn from the anode separator and the cathode separator are mixed in their entirety within the third pipe system. In one embodiment, the fraction of the mixed electrolysis medium is 100% for the upper capacity limit of the electrolysis arrangement, also referred to as upper reference capacity. At the higher reference capacity, the HTO crossover from the cathode chamber to the anode chamber of the electrolysis stack is low, so that full mixing of the unmixed anolyte and unmixed catholyte is possible, which enables easy balancing of the lye concentrations without exceeding the LEL.

According to a preferred embodiment, the fraction of the mixed electrolysis medium is 10% to 90% of the total amount of the alkaline electrolysis medium. Accordingly, the fraction of the unmixed electrolysis medium is 90% to 10% of the total amount of the alkaline electrolysis medium.

More preferred, the fraction of the mixed electrolysis medium is 10% to 50% of the total amount of the alkaline electrolysis medium. Accordingly, the fraction of the unmixed electrolysis medium is 90% to 50% of the total amount of the alkaline electrolysis medium.

Even more preferred, the fraction of the mixed electrolysis medium is 20% to 40% of the total amount of the alkaline electrolysis medium. Accordingly, the fraction of the unmixed electrolysis medium is 80% to 60% of the total amount of the alkaline electrolysis medium. It has been found that it is sufficient to add a relatively small fraction of e.g. 30% of the total quantity of the unmixed electrolysis medium to the third pipe system comprising the mixing device in order to compensate for the concentration differences occurring during alkaline electrolysis within an acceptable period of time, without significantly affecting the production capacity of the electrolyser.

The "total amount of the alkaline electrolysis medium" may be given as a flow, in particular a volume flow, a mass flow or a molar flow. The fraction of the mixed and/or unmixed electrolysis medium may be the fraction of this volume flow, mass flow or molar flow accordingly.

In one embodiment, the third pipe system comprises a first pipe interconnecting the first pipe system and the second pipe system, and a second pipe interconnecting the first pipe system and the second pipe system downstream to the first pipe, and a third pipe interconnecting the first and the second pipe of the third pipe system and comprising the mixing device. Said embodiment represents one example for the configuration of the first pipe system, the second pipe system and the third pipe system so that a first fraction of the electrolysis medium withdrawn from the anode separator (fraction of the unmixed anolyte) and a second fraction of the electrolysis medium withdrawn from the cathode separator (fraction of the unmixed catholyte) can be mixed by the mixing device, so that a fraction of mixed electrolysis medium is obtained.

According to this embodiment, the unmixed anolyte is withdrawn from the first pipe system and introduced into the first pipe of the third pipe system interconnecting the first pipe system and the second pipe system. At the same time, the unmixed catholyte is withdrawn from the second pipe system and introduced into the first pipe of the third pipe system interconnecting the first pipe system and the second pipe system. The unmixed anolyte and catholyte are then mixed by the mixing device which is arranged within the third pipe of the third pipe system, said third pipe interconnecting the first pipe and the second pipe of the third pipe system. Through mixing in the mixing device, the mixed electrolysis medium is obtained, which is further introduced into the second pipe of the third pipe system, which is arranged downstream to the first pipe system. In the second pipe of the third pipe system, the mixed electrolysis medium is split into a mixed anolyte part and a mixed catholyte part and introduced to the first anolyte related and second catholyte related pipe system accordingly.

In one embodiment, the electrolysis arrangement comprises a control valve arranged in the first pipe system to control an amount of the first fraction of electrolysis medium withdrawn from the anode separator fed to the mixing device of the third pipe system, and a control valve arranged in the second pipe system to control an amount of the second fraction of electrolysis medium withdrawn from the cathode separator fed to the mixing device of the third pipe system. In one embodiment, said control valves are arrangement within the first pipe system and/or second pipe system downstream to the first pipe of the third pipe system and upstream to the second pipe of the third pipe system.

In one embodiment, a further control valve is arranged within the first pipe of the third pipe system to control an amount of the first fraction of electrolysis medium withdrawn from the anode separator and withdrawn from the first pipe system. In one embodiment, a further control valve is arranged in the first pipe of the third pipe system to control an amount of the second fraction of electrolysis medium withdrawn from the cathode separator and withdrawn from the second pipe system. Control valves in the first and second pipe system and optional in the first pipe of the third pipe system control the flow rate of the first fraction of the electrolysis medium (unmixed anolyte) and the flow rate of the second fraction of the electrolysis medium (unmixed catholyte) introduced to the mixing device of the third pipe system. Thereby, the amount of the fractions of the mixed electrolysis media is controlled dependent on the current density supplied to the electrolysis stack. For example, if the control valves of the first pipe system are fully open, and the control valves of the first pipe of the third pipe system are fully closed, no mixing of the anolyte and catholyte takes place. Accordingly, if the control valves of the first pipe system are fully closed, and the control valves of the first pipe of the third pipe system are fully open, the anolyte and the catholyte are fully mixed.

In one embodiment, the anode separator and the cathode separator are interconnected by a hydraulic link to balance the liquid levels inside the anode separator and the cathode separator. As water is continuously generated by the electrochemical half reaction in the anode chamber of the electrolysis stack, and water is continuously consumed by the electrochemical half reaction in the cathode chamber of the electrolysis stack, the liquid levels in the gas separators, i.e. the anode separator and the cathode separator, get unbalanced as the electrolysis reaction proceeds. Therefore, in one embodiment a hydraulic link is provided which interconnects the anode separator and the cathode separator to balance the liquid levels in the gas separators.

In one embodiment, a control valve is arranged within the third pipe system downstream to the mixing device, to control the flow of mixed electrolysis medium separately fed to the anode chamber and the cathode chamber of the electrolysis stack, thereby balancing the liquid levels inside the anode separator and the cathode separator.

By the arrangement of a control valve within the third pipe system downstream to the mixing device, the liquid levels or heights in the anode separator and the cathode separator can be balanced, as the control valve controls the amount of mixed electrolyte medium (separately) fed to the anode chamber and the cathode chamber of the electrolysis stack. Therefore, according to one embodiment, the electrolysis arrangement does not comprise a hydraulic link between the anode separator and the cathode separator, i.e. the hydraulic link can be omitted. By removing the hydraulic link between the gas separators, any hydrogen and oxygen mixing through diffusion processes between the separators is prevented. In one embodiment, the control valve receives control signals from liquid level controllers inside the gas separators.

For instance, when the liquid height in the anode separator is higher than in the cathode separator due to the generation of water according to the anode half reaction, the amount of mixed electrolyte fed to the anode chamber of the electrolysis stack should be smaller than the amount of mixed electrolyte fed to the cathode chamber of the electrolysis stack. Hence, according to one embodiment, by means of the control valve arranged within the third pipe system downstream to the mixing device, a higher amount of mixed electrolysis medium is fed to the cathode chamber of the electrolysis stack than to the anode chamber of the electrolysis stack. In this context, when reference is made to the term "amount", in one embodiment the flow rate expressed through the volume flow, mass flow or molar flow is meant.

In one embodiment, the electrolysis arrangement comprises a control device configured to control the amount of the fraction of the mixed electrolysis medium. In one embodiment, the control device controls the amount of the unmixed anolyte and/or catholyte supplied to the mixing device of the third pipe system by controlling the control valves arranged in the first pipe system and/or second pipe system and/or third pipe system.

In one embodiment, the control device controls the amount of the fraction of the mixed electrolysis medium by means of measuring the current density of the direct current supplied to the electrolysis stack. For instance, in case the current density of the direct current supplied to the electrolysis stack is decreased, the control device also decreases the amount of the fraction of the mixed electrolysis medium which is fed to the electrolysis stack. If such a kind of indirect control strategy is chosen, the HTO content dependence on the current density is established for the electrolysis arrangement to determine at which current density the HTO content starts to increase steeply towards a pre-determined safety limit, e.g. the lower explosion limit (LOL). Although this control strategy requires calibration of the electrolysis system prior to the actual start-up, it has the advantage that the measurement of the current density is reliable and can be carried out very easily.

In one embodiment, the control device controls the amount of the fraction of the mixed electrolysis medium by means of measuring the differential pressure of the inlet streams of the electrolyte medium fed to anode chamber and the cathode chamber of the electrolysis stack. Assuming that exactly the same rate of water is supplied to the electrolysis system from outside as is consumed by the electrolysis reaction, it can be assumed that water is generated in the anode chamber by the anode half-reaction and consumed in the cathode chamber by the cathode half reaction. Hence, the higher the current density and therefore the capacity of the electrolyser system, the more water is generated in the anode section and the more water is consumed in the cathode section of the electrolysis arrangement. Hence, a pressure difference will occur between the inlet into the anode chamber and the inlet into the cathode chamber of the electrolysis stack. This pressure difference, which is proportional to the current density and capacity of the electrolysis arrangement, may thus be used to determine the amount of the fraction of the mixed electrolysis medium.

In one embodiment, the control device controls the amount of the fraction of the mixed electrolysis medium by means of measuring the hydrogen to oxygen ratio in the electrolysis medium withdrawn from the anode chamber of the electrolysis stack and/or by measuring the oxygen to hydrogen ratio of the electrolysis medium withdrawn from the cathode chamber of the electrolysis stack. If such a control strategy is chosen, the HTO (anolyte) and/or OTH (catholyte) content is/are measured directly and calibration of the electrolysis system for control purposes is not required.

In one embodiment, the control device further controls the amount of the fraction of the mixed electrolysis medium by means of measuring the electrolyte concentration of the alkaline electrolyte medium circulating in the first pipe system and/or circulating in the second pipe system. Assuming that exactly the same rate of water is supplied to the electrolysis system from outside as is consumed by the electrolysis reaction, it can be assumed that water is generated in the anode chamber by the anode half-reaction and consumed in the cathode chamber by the cathode half reaction. Accordingly, the lye concentration decreases in the first pipe system and increases in the second pipe system. These processes occur the faster the more hydrogen and oxygen are produced, i.e. the higher the current density of the direct current supplied to the electrolysis stack. The concentration of the lye in the first pipe system and in the second pipe system can therefore also be used to control the amount of the fraction of the mixed electrolysis medium. In one embodiment, the electrolyte concentration range used to measure the electrolyte concentration is from 29% to 35%. In the range, the most accurate measurements can be carried out.

In general, at least one of the underlying problems is at least partially solved by a method to produce hydrogen and oxygen by alkaline water electrolysis, the method comprising the method steps of
  a. feeding an alkaline electrolysis medium to the anode chamber of an electrolysis stack, wherein oxygen is generated in the anode chamber of the electrolysis stack, and separating the generated oxygen from the electrolysis medium withdrawn from the anode chamber of the electrolysis stack in an anode separator;
  b. feeding an alkaline electrolysis medium to the cathode chamber of an electrolysis stack, wherein hydrogen is generated in the cathode chamber of the electrolysis stack, and separating the generated hydrogen from the electrolysis medium withdrawn from the cathode chamber of the electrolysis stack in a cathode separator;
  c. mixing a fraction of the electrolysis medium fed to the anode chamber with a fraction of the electrolysis medium fed to the cathode chamber, whereby a fraction of a mixed electrolysis medium is obtained, which is fed to the electrolysis stack, and wherein
  an amount of the fraction of the mixed electrolysis medium is decreased when a current density of a direct current supplied to the electrolysis stack is decreased, and an amount of the fraction of the mixed electrolysis medium is increased when a current density of a direct current supplied to the electrolysis stack is increased.

The aforementioned process steps a. to c. do not necessarily have to be carried out in the specified order.

In one embodiment, the fraction of the mixed electrolysis medium is split and separately fed to the anode chamber and the cathode chamber of the electrolysis stack.

In one embodiment, the fraction of the mixed electrolysis medium is from 0% to 100% of the total amount of the alkaline electrolysis medium, or from 0.1% to 100%, or from 1% to 100%. In one preferred embodiment, the fraction of the mixed electrolysis medium is from 10% to 90% of the total amount of the alkaline electrolysis medium. In one further preferred embodiment, the fraction of the mixed electrolysis medium is from 10% to 50% of the total amount of the alkaline electrolysis medium. In one even further preferred embodiment, the fraction of the mixed electrolysis medium is from 20% to 40% of the total amount of the alkaline electrolysis medium.

In one embodiment, the amount of the fraction of the mixed electrolysis medium is controlled by means of a control device.

In one embodiment, the control device controls the amount of the fraction of the mixed electrolysis medium by means of measuring the current density of the direct current supplied to the electrolysis stack.

In one embodiment, the control device controls the amount of the fraction of the mixed electrolysis medium by measuring the hydrogen to oxygen ratio in the electrolysis medium withdrawn from the anode chamber of the electrolysis stack and/or by measuring the oxygen to hydrogen ratio in the electrolysis medium withdrawn from the cathode chamber of the electrolysis stack.

In one embodiment, the control device controls the amount of the fraction of the mixed electrolysis medium by the differential pressure of the inlet streams of the electrolyte medium fed to anode chamber and the cathode chamber of the electrolysis stack.

In one embodiment, the control device further controls the amount of the fraction of the mixed electrolysis medium by measuring the electrolyte concentration of the alkaline electrolyte medium fed to the anode chamber of the electrolysis stack and/or by measuring the electrolyte concentration of the alkaline electrolyte medium fed to the cathode chamber of the electrolysis stack.

BRIEF DESCRIPTION OF THE DRAWINGS

The invention will now be detailed by way of exemplary embodiments and examples with reference to the attached drawings. Unless otherwise stated, the drawings are not to scale. In the figures and the accompanying description, equivalent elements are each provided with the same reference marks.

DETAILED DESCRIPTION OF PREFERRED EMBODIMENTS

Figure 1:
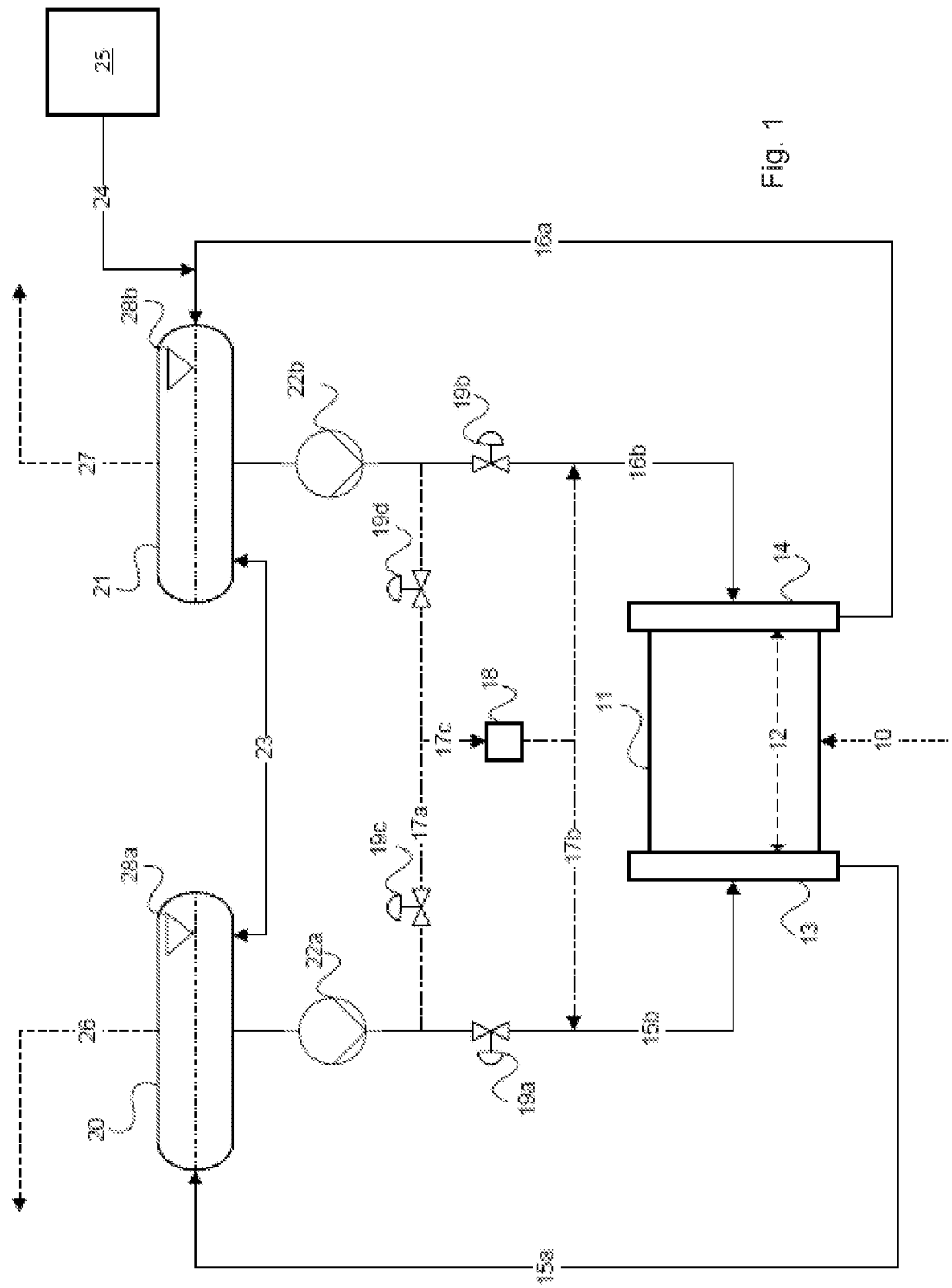
FIG. 1 depicts an electrolysis arrangement according to a first embodiment of the invention.

FIG. 1 depicts an electrolysis arrangement according to a first embodiment of the invention. The electrolysis arrangement comprises an electrolysis stack 11 to which direct current 10 with a certain current density is supplied for the water splitting electrolysis reaction within the electrolysis stack. The current density can fluctuate, for example if the electricity is generated from a renewable energy source, such as wind power.

The electrolysis stack comprises a plurality of anodes and cathodes, as well as a plurality of anode and cathode chambers, of which for the sake of simplification the anode chamber 13 and the cathode chamber 14 are shown. Within the anode chamber 13, oxygen is generated by oxidation of water-bound oxygen at the anode. Within the cathode chamber 14, hydrogen is generated by reduction of water-bound hydrogen at the cathode. The anode and the cathode are physically separated by a diaphragm, which enables the exchange of hydroxyl ions between the anode and the cathode chamber of the electrolysis stack. To some extent, also diffusion of oxygen and hydrogen through the diaphragm is possible. Crossover of oxygen to the cathode chamber is referred to as oxygen to hydrogen (OTH) and crossover of hydrogen to the anode chamber is referred to as hydrogen to oxygen (HTO). Both processes are indicated by the dashed arrow 12. As the diffusion coefficient of hydrogen is significantly higher than the diffusion coefficient of oxygen, mostly HTO occurs. This may result in an increasing hydrogen concentration in the cathode chamber 14 and further cathode related parts of the electrolysis arrangement and an exceedance of the lower explosion limit (LEL) for hydrogen to oxygen (HTO).

The electrolysis arrangement as depicted in FIG. 1 further comprises a first pipe system, which at least comprises the pipes 15a and 15b. Within the first pipe system, an anode separator 20 is arranged. Within the anode separator 20, gaseous oxygen is physically separated from the liquid electrolysis medium circulating within the first pipe system. The electrolysis medium is highly concentrated aqueous potassium hydroxide (KOH) solution. The electrolysis medium circulating within the first pipe system is also referred to as the anolyte of the electrolysis medium. The oxygen loaded anolyte is withdrawn from the anode chamber 13 via pipe 15a, introduced into the anode separator 20 and after separation of oxygen, the oxygen depleted anolyte is withdrawn from anode separator 20 and sent to the anode chamber 13 of the electrolysis stack 11 to generate oxygen by the electrolysis reaction again. Circulation of the anolyte within the first pipe system is effected by pump 22as. The anode separator 20 is equipped with a liquid level controller 28a, which controls the liquid level of the anolyte within the anode separator 20. The gaseous oxygen product separated within anode separator 20 is withdrawn via pipe 26 and subjected to a further processing step, e.g. a drying step. Also a flow meter (not shown) may be arranged within the first pipe system.

The electrolysis arrangement according to the example of FIG. 1 further comprises a second pipe system, which at least comprises the pipes 16a and 16b. Within the second pipe system, a cathode separator 21 is arranged. Within the cathode separator 21, gaseous hydrogen is physically separated from the electrolysis medium circulating within the second pipe system. The electrolysis medium (KOH solution) circulating within the second pipe system is also referred to as the catholyte of the electrolysis medium. The hydrogen loaded catholyte is withdrawn from the cathode chamber 14 via pipe 16a, introduced into the cathode separator 21 and after separation of hydrogen, the hydrogen depleted catholyte is withdrawn from cathode separator 21 and sent to the cathode chamber 14 of the electrolysis stack 11 to generate hydrogen by the electrolysis reaction again. Circulation of the catholyte within the second pipe system is affected by pump 22ab. The cathode separator 21 is equipped with a liquid level controller 28b, which controls the liquid level of the catholyte within the cathode separator 21. The gaseous hydrogen product separated within cathode separator 21 is withdrawn via pipe 27 and subjected to a further processing step, e.g. a drying step. Also a flow meter (not shown) may be arranged within the second pipe system.

As water is continuously consumed by the electrolysis reaction, a water storage tank 25 is provided, so that water can be fed to the second pipe system by water feed pipe 24. The amount of water added per unit of time through water feed pipe 24 corresponds to the amount of water consumed per unit of time by the production of hydrogen and oxygen of the electrolysis arrangement.

Due to the anode and cathode related electrochemical half reactions in alkaline water electrolysis, per mol of produced hydrogen one mol of water is generated within the anode chamber and two mol of water are consumed within the cathode chamber of the electrolysis stack.

Hence, the KOH concentrations within the separated pipe systems of the electrolysis arrangement will get unbalanced as the electrolysis reaction progresses. In particular, the KOH concentration within the first pipe system (pipes 15a, 15b), the anode separator 20 and the anode chamber 13 decreases (water generation), and the KOH concentration within the second pipe system (pipes 16a, 16b), the cathode separator 21 and the cathode chamber 14 increases (water consumption).

Furthermore, the water amount increases in the anode related section of the electrolysis arrangement, and the water amount decreases in the cathode related section of the electrolysis arrangement. Hence, also the liquid levels between the anode separator 20 and the cathode separator 21 get unbalanced.

Figure 3:
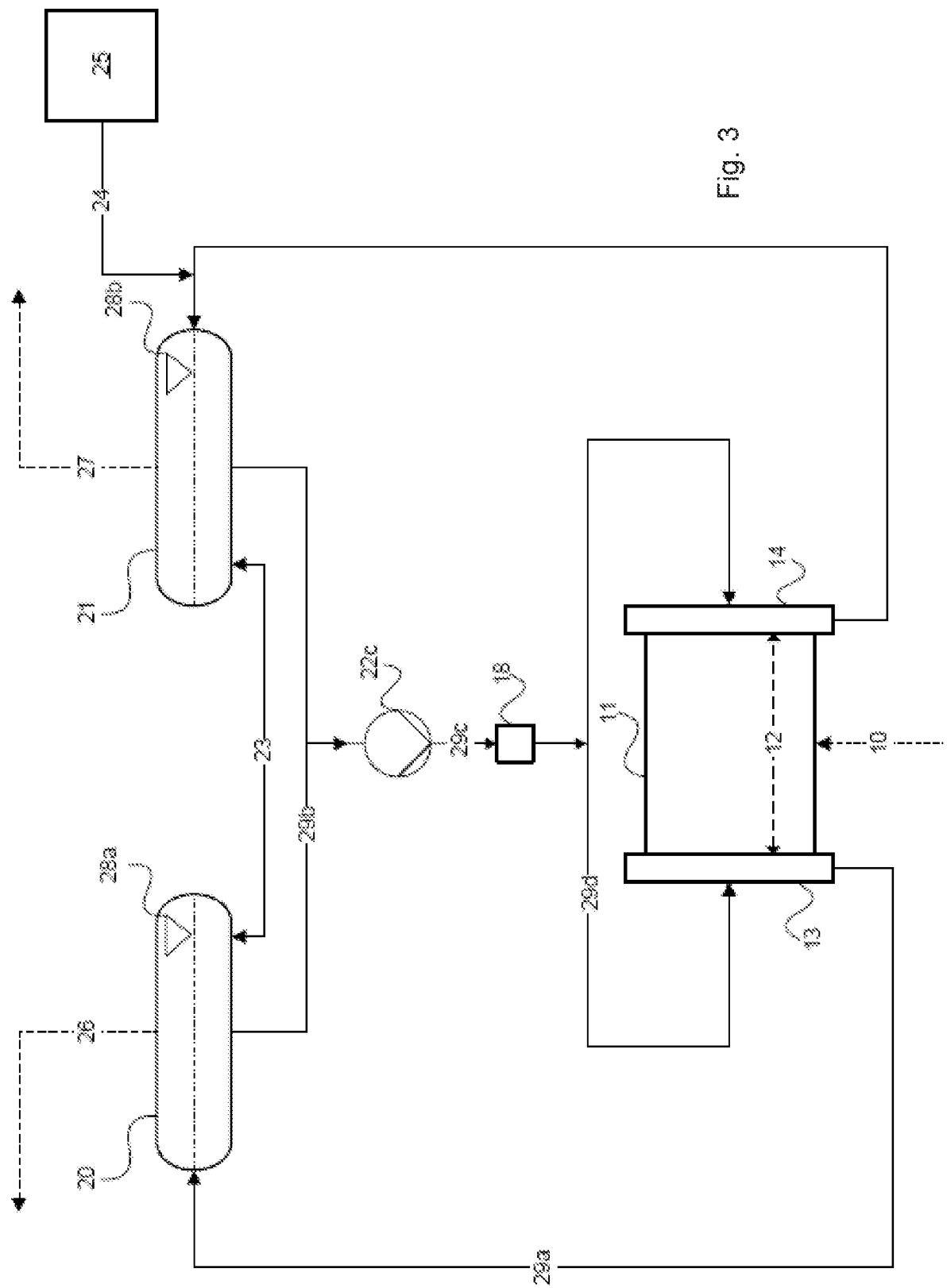
FIG. 3 depicts an electrolysis arrangement according to the prior art.
Figure 4A:
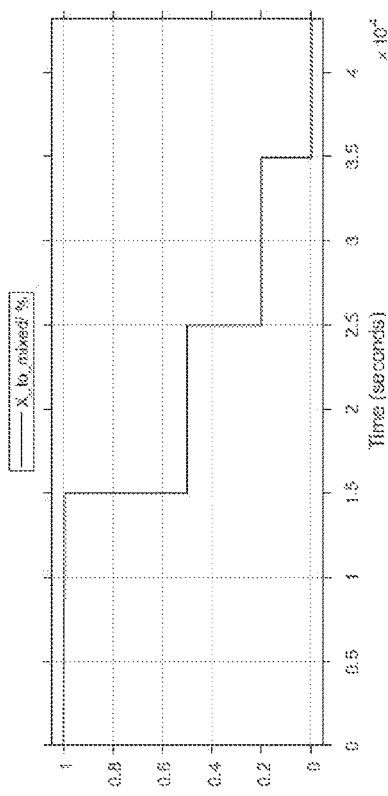
FIG. 4a depicts a simulation which demonstrates the technical effect achieved by the invention.
Figure 4B:
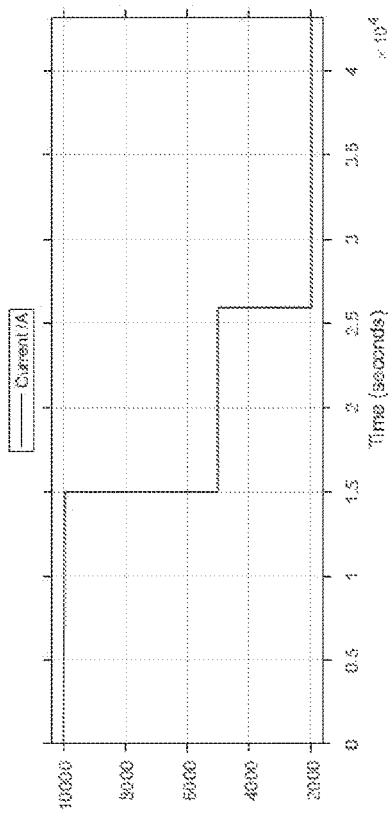
FIG. 4b depicts a simulation which demonstrates the technical effect achieved by the invention.
Figure 4C:
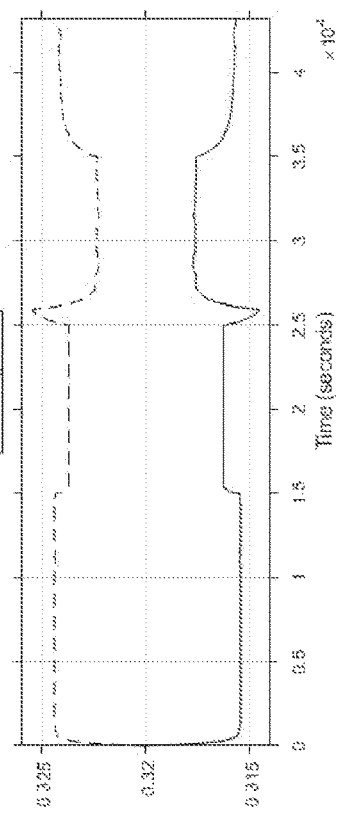
FIG. 4c depicts a simulation which demonstrates the technical effect achieved by the invention.
Figure 4D:
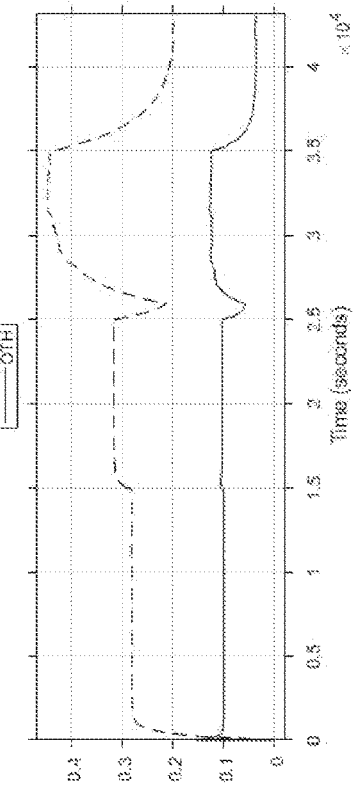
FIG. 4d depicts a simulation which demonstrates the technical effect achieved by the invention.

To balance the KOH concentration between the anolyte and the catholyte, both electrolyte types (anolyte and catholyte) may be mixed in their entirety as known from the prior art and shown in FIG. 3. According to the prior art solution, the anolyte withdrawn from anode separator 20 and the catholyte withdrawn from cathode separator 21 are merged via pipe 29b and are fully mixed within mixing device 18. Downstream to the mixing device 18, the mixed electrolysis medium is split and separately fed to the anode chamber 13 (mixed anolyte) and the cathode chamber 14 (mixed catholyte) of the electrolysis stack 11. However, as aforementioned, at low current densities of the direct current 10 supplied to electrolysis stack 11, also HTO crossover is high. This ultimately results, due to the full mixing of anolyte and catholyte in mixing device 18, in high hydrogen concentrations within the anode related parts (anode chamber 13, pipe 29a, anode separator 20, parts of pipe 29b). This may result in the problem that a lower explosion limit (LEL) for anode related parts of the electrolysis arrangement is exceeded.

This problem is solved by the electrolysis arrangement according to the invention, which enables to operate the electrolyser in "full mix" mode, "no mix mode" and all transitional states in between, i.e. "partial mix mode". According to this principle the unmixed anolyte and catholyte withdrawn from the separators 20 and 21 can either be no mixed at all, partly mixed (e.g. at low turn-down capacities with low current densities) or fully mixed (at full capacity and high current densities). Therefore, the first pipe system comprising the pipes 15a and 15b and the second pipe system comprising the pipes 16a and 16b are separate circuits, but are interconnected by a third pipe system comprising the pipes 17a, 17b and 17c. The third pipe system interconnects the first and the second pipe system. The third pipe system contains the mixing device 18 and is arranged in a way that either no mixing, partly mixing or full mixing of the unmixed anolyte and catholyte is enabled. A first pipe 17a of the third pipe system interconnects pipe 15b of the first pipe system and pipe 16b of the second pipe system. A second pipe 17b of the third pipe system is arranged downstream to the first pipe 17a of the third pipe system and interconnects pipe 15b of the first pipe system and pipe 16b of the second pipe system. Pipes 17a and 17b are interconnected by pipe 17c, which contains the mixing device 18.

Furthermore, a control valve 19a, which controls the flow through pipe 15b, is arranged within pipe 15b. Further control valves 19b, 19c and 19d are arranged within pipes 16b (second pipe system) and 17a (third pipe system). Control valves 19a, 19b, 19c and 19d control the amount of the fraction of the unmixed anolyte and unmixed catholyte sent to mixing device 18 and therefore the amount of the fraction of the mixed electrolysis medium sent separately to the anode chamber 13 and cathode chamber 14 via pipes 17b, 15b and 16b. The volume or mass flow through control valves 19a, 19b, 19c and 19d may be controlled by the current density of the direct current 10 supplied to the electrolysis stack 11, or the HTO concentration in the first pipe system as the control variable. Furthermore, the concentration of KOH in the first and/or second pipe system and further related parts may be used as a control variable.

In case a current density of the direct current 10 supplied to the electrolysis stack 11 is decreased, HTO crossover in the system increases. To decrease the HTO crossover, the amount of the unmixed anolyte passing valve 19a is increased and the amount of the unmixed anolyte passing valve 17a is decreased, so that less mixing occurs. The same applies for the catholyte and valves 19b and 19d accordingly. Hence, the amount of the fraction of the mixed electrolyte is decreased, and HTO crossover is decreased as well, so that exceed of a LEL is prevented. As a result, the electrolyser of the electrolysis arrangement can be operated safely also at low current densities, without exceeding a LEL.

As mentioned before, due to the nature of the half-cell reactions, water is generated in the anode chamber 13 of the electrolysis stack 11 and water is consumed in the cathode chamber 14 of the electrolysis stack 11. Hence, also the amount of water in the first and second pipe system has to balanced. According to the embodiment of FIG. 1, this is achieved by an hydraulic link 23 between the anode separator 20 and the cathode separator 21. The liquid level in the separators 20 and 21 are measured by liquid level controllers 28a and 28b. Dependent on the measured levels, either anolyte is transferred to the cathode separator or catholyte is transferred to the anode separator. As the concentration of hydrogen and oxygen in the separators 20 and 21 is high, also some HTO and OTH crossover might occur through hydraulic link 23.

Figure 2:
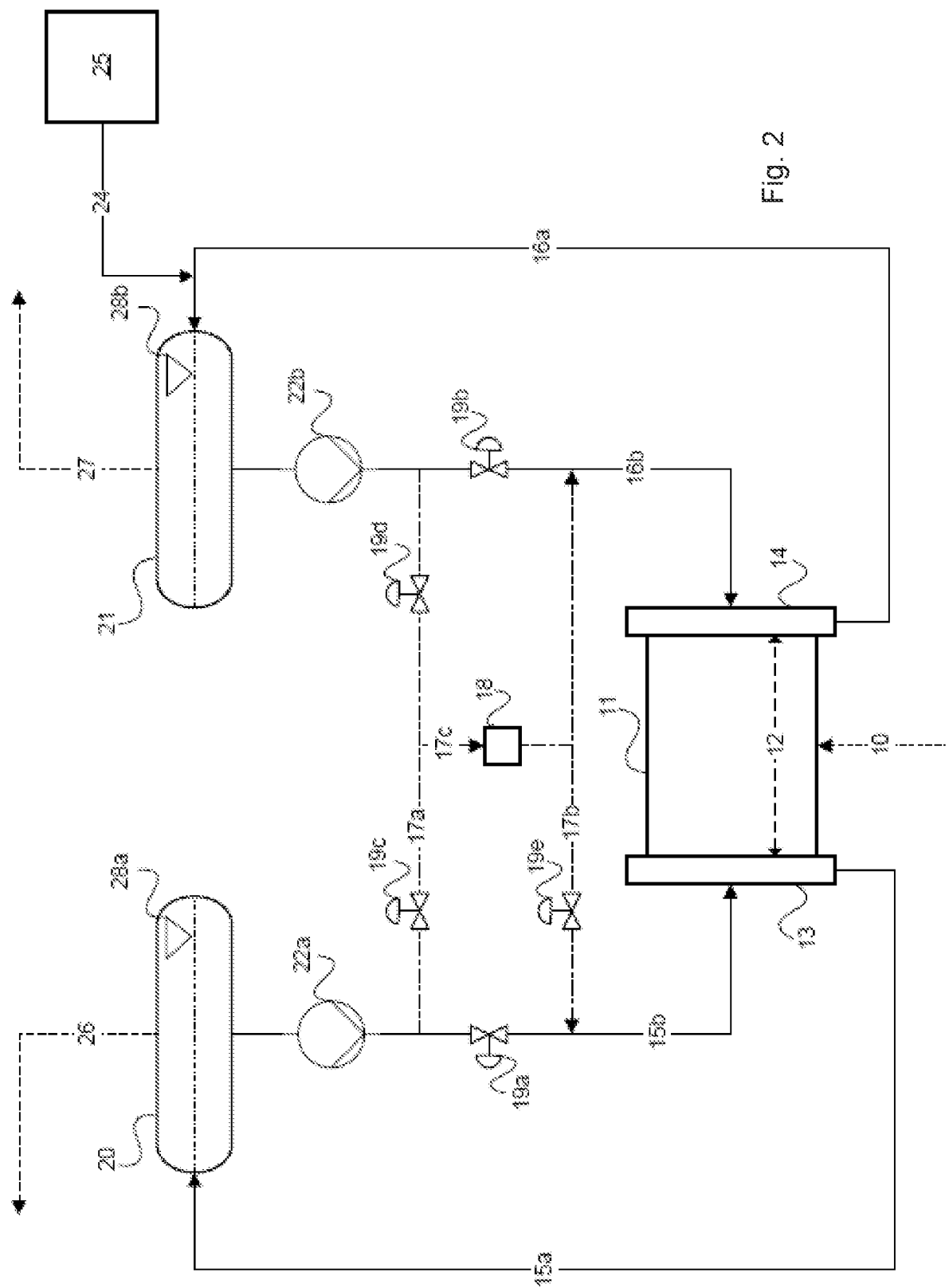
FIG. 2 depicts an electrolysis arrangement according to a second embodiment of the invention.

This problem is avoided by the solution according to the embodiment of FIG. 2. According to this embodiment, an additional control valve 19e is arranged within pipe 17b of the third pipe system. The control valve 19e is arranged within the third pipe system downstream to the mixing device 18. Control valve 19e controls the liquid levels in the separators 20 and 21 by decreasing or increasing the flow (volume flow or mass flow) of the mixed electrolysis medium sent to the anode chamber 13, thereby at the same time either increasing or decreasing the flow of the mixed electrolysis medium sent to the cathode chamber 14. Accordingly, the liquid levels in the separators 20 and 21 are controlled and balanced. The measured liquid levels of liquid controllers 28a and 28b may be used as controlled variables to control the flow through control valve 19e.

The diagrams in FIG. 4 demonstrate the technical effect of the invention using a simulation. All four diagrams have the same time scale in relation to the x-axis, with time in seconds×10$^4$. The diagram at the top left shows the change in the electric current supplied to the electrolysis stack in amperes over time. This electric current is proportional to the current density for a defined electrolysis stack. The diagram on the top right shows the amount of the fraction X of the mixed electrolyte in relation to the total amount of electrolyte. The diagram at the bottom left shows the hydrogen concentration in oxygen (HTO; anode side-dashed line) and the oxygen concentration in hydrogen (OTH; cathode side-solid line), each in % per volume (vol.-%). Finally, the diagram at the bottom right shows the concentration of the electrolyte, i.e. the aqueous potassium hydroxide solution for the anode side (A; solid line) and the cathode side (C; dashed line) for control purposes.

At a high electric current of 10 kA, i.e. high current density, and correspondingly at high hydrogen (or oxygen) production capacities, the HTO value is less than 0.3 vol-%. X is 1, i.e. the anolyte withdrawn from the anode separator and the catholyte withdrawn from the cathode separator are completely mixed before feeding to the electrolysis stack. After 1.5×10$^4$ seconds, the current is lowered to 5 kA. By now lowering the X-value to 0.5, i.e. halving the amount of mixed electrolyte, the original HTO value of 0.3 vol.% can be kept almost constant. Lowering the amount of mixed electrolyte thus helps to prevent HTO from rising to a critical value. If the current is lowered further (from 2.5×10$^4$ seconds) to 2 kA, the HTO value increases to over 0.4 vol.-% despite the simultaneous lowering of the amount of mixed electrolyte to X=0.2. However, by further lowering the fraction X to zero (no mixing at all), it is possible to counteract this. By this measure, the HTO value drops to a non-critical value of 0.2 vol.-%.

The example thus demonstrates how the HTO value can be controlled by adjusting the proportion X to the available electric current or current density. The further the electric current decreases, the further the proportion X is decreased and vice versa. The extent to which this must be done can be determined, for example, by calibrating the system before starting operation. In doing so, it is determined how high the HTO value is at which X depending on the current density in each case. Accordingly, X can be adjusted during operation to the current density supplied to the electrolysis stack.

LIST OF REFERENCE SIGNS 10 direct current
11 electrolysis stack
12 HTO/OTH crossover
13 anode chamber
14 cathode chamber
15a, 15b pipe (first pipe system)
16a, 16b pipe (second pipe system)
17a, 17b, 17c pipe (third pipe system)
18 mixing device
19a, 19b, 19c, 19d, 19e control valve
20 anode separator
21 cathode separator
22a, 22b, 22c pump
23 hydraulic link
24 water feed
25 water storage tank
26 oxygen product
27 hydrogen product
28a, 28b liquid level controller
29a, 29b, 29c, 29d pipe It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An electrolysis arrangement comprising;
an electrolysis stack for the electrochemical production of hydrogen and oxygen from an alkaline electrolysis medium, wherein the electrolysis stack comprises an anode chamber and a cathode chamber;
an anode separator for the separation of oxygen from the electrolysis medium,
a cathode separator for the separation of hydrogen from the electrolysis medium,
a first pipe system to circulate the electrolysis medium between the anode chamber of the electrolysis stack and the anode separator;
a second pipe system to circulate the electrolysis medium between the cathode chamber of the electrolysis stack and the cathode separator;
a third pipe system interconnecting the first pipe system and the second pipe system and comprising a mixing device, wherein
the first pipe system, the second pipe system and the third pipe system are configured so that a first fraction of an electrolysis medium withdrawn from the anode separator and a second fraction of an electrolysis medium withdrawn from the cathode separator is mixed by the mixing device, thereby resulting in a fraction of a mixed electrolysis medium which is fed to the electrolysis stack, wherein
the electrolysis arrangement is further configured so that an amount of the fraction of the mixed electrolysis medium is decreased when a current density of a direct current supplied to the electrolysis stack is decreased, and
an amount of the fraction of the mixed electrolysis medium is increased when a current density of a direct current supplied to the electrolysis stack is increased.

2. The electrolysis arrangement according to claim 1, wherein the fraction of the mixed electrolysis medium is from 0% to 100% of the total amount of the alkaline electrolysis medium.

3. The electrolysis arrangement according to claim 1, wherein the third pipe system comprises a first pipe interconnecting the first pipe system and the second pipe system, and a second pipe interconnecting the first pipe system and the second pipe system downstream to the first pipe, and a third pipe interconnecting the first and the second pipe of the third pipe system and comprising the mixing device.

4. The electrolysis arrangement according to claim 1, wherein the anode separator and the cathode separator are interconnected by a hydraulic link to balance the liquid levels inside the anode separator and the cathode separator.

5. The electrolysis arrangement according to claim 1, wherein the fraction of the mixed electrolysis medium is split and separately fed to the anode chamber and the cathode chamber of the electrolysis stack.

6. The electrolysis arrangement according to claim 5, wherein a control valve is arranged within the third pipe system downstream to the mixing device, to control the flow of mixed electrolysis medium separately fed to the anode chamber and the cathode chamber of the electrolysis stack, thereby balancing the liquid levels inside the anode separator and the cathode separator.

7. The electrolysis arrangement according to claim 6, wherein the electrolysis arrangement does not comprise a hydraulic link between the anode separator and the cathode separator.

8. The electrolysis arrangement according to claim 6, wherein by means of the control valve arranged within the third pipe system downstream to the mixing device, a higher amount of mixed electrolysis medium is fed to the cathode chamber of the electrolysis stack than to the anode chamber of the electrolysis stack.

9. The electrolysis arrangement according to claim 1, further comprising a control device configured to control the amount of the fraction of the mixed electrolysis medium.

10. The electrolysis arrangement according to claim 9, wherein the control device controls the amount of the fraction of the mixed electrolysis medium by means of measuring the differential pressure of the inlet streams of the electrolyte medium fed to anode chamber and the cathode chamber of the electrolysis stack.

11. The electrolysis arrangement according to claim 9, wherein the control device controls the amount of the fraction of the mixed electrolysis medium by means of measuring the hydrogen to oxygen ratio in the electrolysis medium withdrawn from the anode chamber of the electrolysis stack and/or by measuring the oxygen to hydrogen ratio of the electrolysis medium withdrawn from the cathode chamber of the electrolysis stack.

12. The electrolysis arrangement according to claim 9, wherein the control device controls the amount of the fraction of the mixed electrolysis medium by means of measuring the current density of the direct current supplied to the electrolysis stack.

13. The electrolysis arrangement according to claim 12, wherein the control device further controls the amount of the fraction of the mixed electrolysis medium by means of measuring the electrolyte concentration of the alkaline electrolyte medium circulating in the first pipe system and/or circulating in the second pipe system.

14. A method to produce hydrogen and oxygen by alkaline water electrolysis, the method comprising the method steps of
   a. feeding an alkaline electrolysis medium to the anode chamber of an electrolysis stack, wherein oxygen is generated in the anode chamber of the electrolysis stack, and separating the generated oxygen from the electrolysis medium withdrawn from the anode chamber of the electrolysis stack in an anode separator;
   b. feeding an alkaline electrolysis medium to the cathode chamber of an electrolysis stack, wherein hydrogen is generated in the cathode chamber of the electrolysis stack, and separating the generated hydrogen from the electrolysis medium withdrawn from the cathode chamber of the electrolysis stack in a cathode separator;
   c. mixing a fraction of the electrolysis medium fed to the anode chamber with a fraction of the electrolysis medium fed to the cathode chamber, whereby a fraction of a mixed electrolysis medium is obtained, which is fed to the electrolysis stack, and wherein
   an amount of the fraction of the mixed electrolysis medium is decreased when a current density of a direct current supplied to the electrolysis stack is decreased, and
   an amount of the fraction of the mixed electrolysis medium is increased when a current density of a direct current supplied to the electrolysis stack is increased.

* * * * *